United States Patent [19]
Chorkey, Sr. et al.

[11] Patent Number: 5,217,212
[45] Date of Patent: Jun. 8, 1993

[54] SHOCK ABSORBER

[75] Inventors: William J. Chorkey, Sr., Farmington; David R. Claydon, Brighton, both of Mich.

[73] Assignee: Ace Controls, Inc., Farmington, Mich.

[21] Appl. No.: 858,034

[22] Filed: Mar. 26, 1992

[51] Int. Cl.$^5$ .................. B60G 13/08; F16F 9/00
[52] U.S. Cl. ...................... 267/226; 188/288; 188/322.19
[58] Field of Search .............. 267/64.12, 64.26, 34, 267/120, 226; 188/311, 312, 315, 316, 322.11, 322.13, 322.19, 322.22, 285, 287; 296/56

[56] References Cited
U.S. PATENT DOCUMENTS

| | | | |
|---|---|---|---|
| 3,307,842 | 12/1964 | Ellis, Jr. | 188/287 |
| 3,340,965 | 9/1967 | Ellis, Jr. | 188/287 |
| 3,446,317 | 5/1969 | Gryglas | 188/315 |
| 3,666,256 | 5/1972 | Ellis et al. | 188/311 |
| 4,015,835 | 4/1977 | Schumacher et al. | 188/287 |
| 4,044,865 | 8/1977 | Tourunen | 188/287 |
| 4,500,075 | 2/1985 | Tsuchiya et al. | 188/322.22 |
| 4,585,099 | 4/1986 | Taylor | 188/322.15 |
| 4,796,732 | 1/1989 | Kong | 188/322.22 |
| 4,877,114 | 10/1989 | Taylor | 188/322.22 |
| 5,050,712 | 9/1991 | Heideman | 188/315 |

*Primary Examiner*—Matthew C. Graham
*Assistant Examiner*—Chris Schwartz
*Attorney, Agent, or Firm*—Robert G. Mentag

[57] ABSTRACT

A shock absorber having a tubular body member provided with an accumulator chamber in one end thereof, and an axially aligned piston chamber in the other end thereof. A combination piston and piston rod member is telescopically mounted in the piston chamber. A check valve assembly is mounted in the tubular body member, which permits a metered flow of shock absorber oil from the piston chamber into the accumulator chamber when the combination piston and piston rod member is moved in an inward direction in the tubular body member, and which allows a free flow of the oil from the accumulator chamber when the combination piston and piston rod member is moved in an outward direction in the tubular body member.

12 Claims, 3 Drawing Sheets

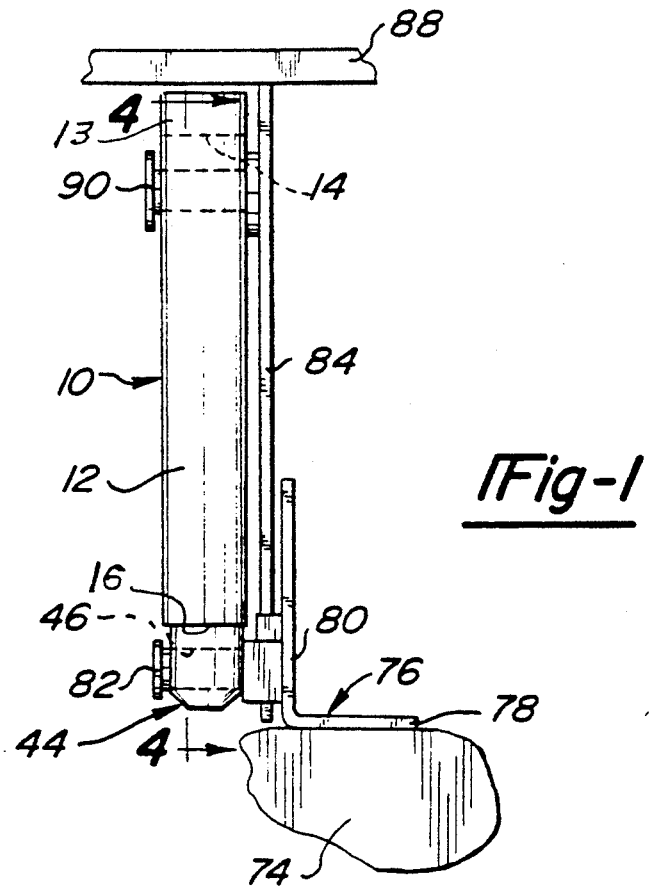
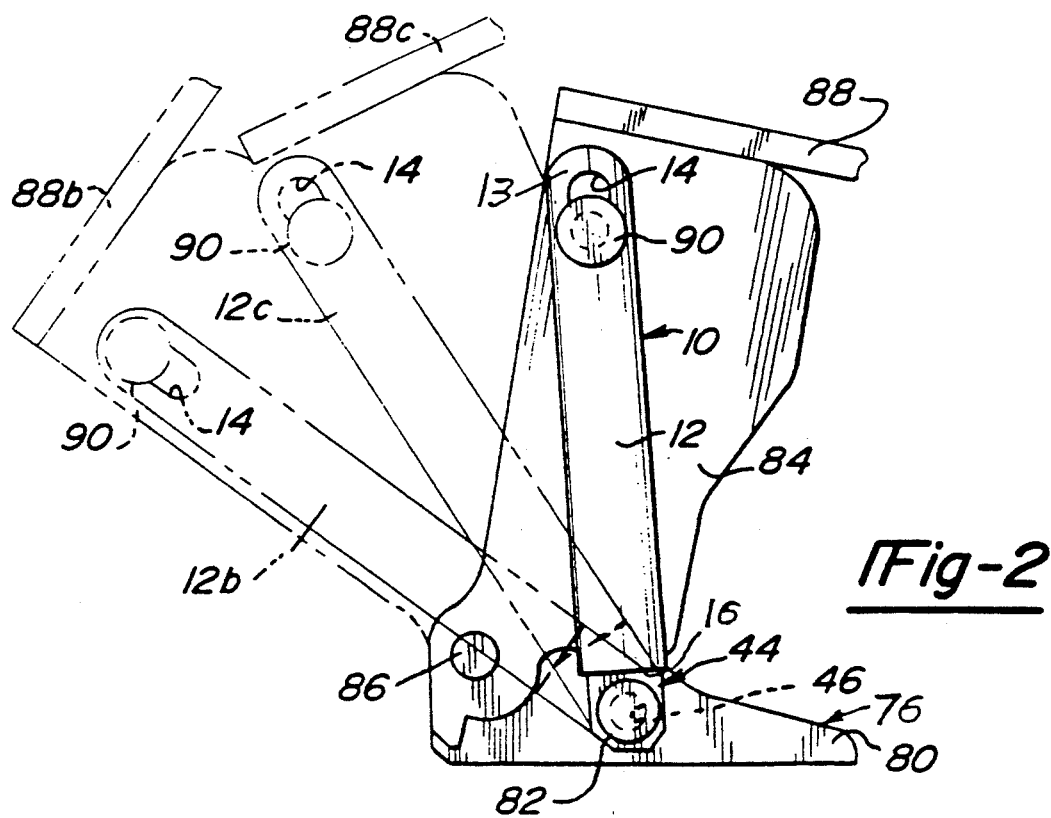

SHOCK ABSORBER

BACKGROUND OF THE INVENTION

1. Technical Field

The field of art to which this invention pertains may be generally located in the class of devices relating to shock absorbers. Class 188, Brakes, U.S. Patent Office Classification, appears to be the applicable general area of art to which the subject matter similar to this invention has been classified in the past.

2. Background Information

This invention relates generally to shock absorbers, and more particularly, to a shock absorber which may be advantageously adapted for use in decelerating the final closing movement of a pivotally mounted member, such as a lid for a conventional copy machine. Many copy machines have a swingably mounted lid which must be swung upwardly from a horizontal closed position to an open position to permit the user of the copy machine to place a paper to be copied on a horizontal glass plate. After the paper to be copied has been placed in position on the glass plate, the lid is then manually swung from the open position toward a closed position over said paper, and in many instances the user of the copy machine will drop the lid cover instead of lowering it slowly until it is seated on said glass plate. A disadvantage of such a copy machine lid arrangement is that the final manually controlled closing movement of the lid causes the lid in many instances to be dropped on the glass plate, and sometimes on the user's fingers. Also the paper placed on the glass plate may be moved off the desired position, by means of the lid coming down too quickly and moving the paper off said desired position by direct contact or by air pressure created by the quick downward movement of the lid.

In view of the foregoing, it is a primary object of the present invention to provide an economical shock absorber which may be operatively mounted to a swingably mounted member, such as the lid of a copy machine, for automatically controlling the deceleration of the lid during the final closing movement of the lid.

It is another object of the present invention to provide a shock absorber which may be pivotally mounted on a copy machine and attached to a swingable lid of the copy machine so as to permit an initial free closing movement portion of the lid, followed by a controlled deceleration movement for the ending portion of the closing movement of the lid.

SUMMARY OF THE INVENTION

The aforegoing objects are made possible by a shock absorber according to the invention comprising a shock absorber body having an accumulator chamber formed in one end thereof, and an axially aligned piston chamber formed in the other end thereof. An accumulator means is operatively mounted in the accumulator chamber. A combination piston and piston rod is telescopically mounted in the piston chamber. A check valve assembly is operatively mounted in said shock absorber body, between said accumulator chamber and said piston chamber. Said check valve assembly including a metering orifice that is operative to permit shock absorber oil in said piston chamber to be forced under pressure into the accumulator chamber when the combination piston and piston rod is moved in an inward direction in the piston chamber when the shock absorber receives an impact force. Said check valve assembly also being operative to permit the shock absorber oil forced into the accumulator chamber to be returned to the piston chamber when the impact force is removed from the shock absorber and the combination piston and piston rod is moved in an outward direction in the piston chamber.

The shock absorber body member and the combination piston and piston rod member are each provided with an attachment member for operatively attaching the shock absorber members to and between a pair of objects, wherein the movement of one object toward the other is controlled and decelerated. One of the attachment members may be made to provide a portion of a movement of one object toward another which is free of control by the shock absorber, after which continued movement of said one object is controlled and decelerated.

BRIEF DESCRIPTION OF THE DRAWINGS

FIG. 1 is an elevation view of a fluid shock absorber of the present invention which is adapted to control and decelerate the closing movement of a lid of a copier machine.

FIG. 2 is a left side elevation view of the fluid shock absorber shown in FIG. 1, and showing the action of the shock absorber when the copier machine lid is moved from an open position to a closed position.

DESCRIPTION OF THE PREFERRED EMBODIMENTS

Figure 3:
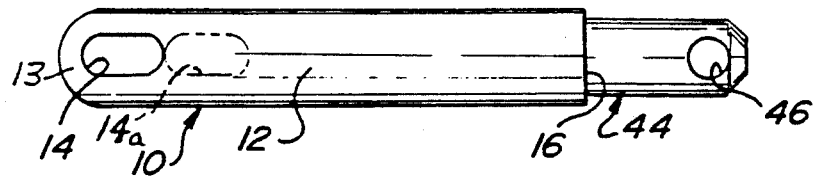
FIG. 3 is a side view of the fluid shock absorber shown in FIGS. 1 and 2.

Referring now to the drawings, and in particular to FIGS. 1 thru 5, the numeral 10 generally designates a shock absorber made in accordance with the principles of the present invention. The shock absorber 10 includes an elongated cylindrical body 12 made from a suitable metal for shock absorbers. Extended longitudinally inward from one end 16 of the body 12 is a stepped cylindrical bore, comprising an outer bore 18 having a first diameter and which communicates with an inner smaller second diameter bore 20. The other end of the body 12 is closed as indicated by the numeral 13, and it has formed therethrough an elongated mounting slot 14 which is rounded on the ends thereof.

Figure 4:
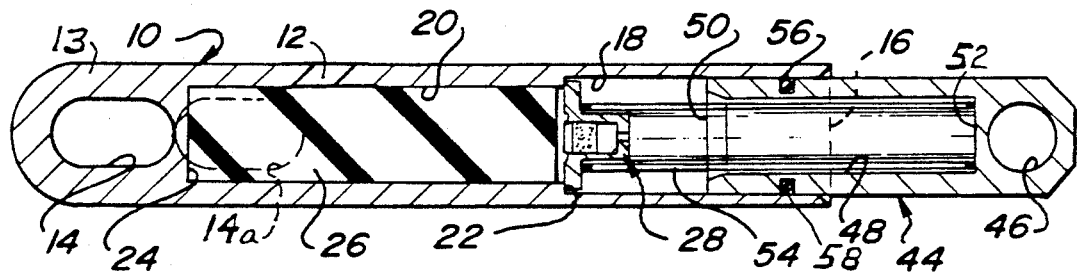
FIG. 4 is an enlarged, elevation section view of the fluid shock absorber illustrated in FIG. 1, taking along the line 4—4 thereof, with parts removed, and looking in the direction of the arrows.
Figure 5:
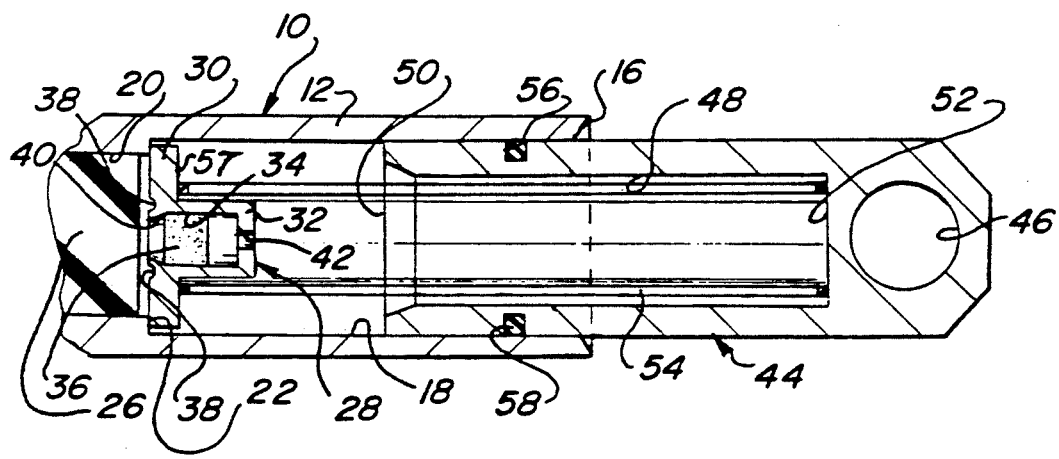
FIG. 5 is an enlarged, partial, view of the right end of the fluid shock absorber shown in FIG. 4.

As shown in FIGS. 4 and 5, a transverse seat or shoulder 22 is formed at the junction point between the communicating ends of the outer bore 18 and the smaller diameter inner bore 20. The numeral 24 in FIG. 4, designates the closed end of the inner bore 20. The inner bore 20 functions as an accumulator chamber in which is operatively mounting an accumulator means 26 that comprises a closed cell sponge. The closed cell sponge accumulator means 26 extends from the closed end 24 of the inner bore 20 to approximately the shoulder 22 between the bores 18 and 20.

As best seen in FIG. 5, a check valve assembly, generally indicated by the numeral 28, is operatively mounted in the outer bore 18, and it includes a round plate or washer 30 which is seated against the shoulder 22 between the bores 18 and 20. The check valve plate 30 is made from a metal suitable for shock absorbers. Integrally formed on the inner side of the check valve plate 30 is a cylindrical body 32 which extends inwardly into the outer bore 18. The integral body 32 is of a diameter smaller than the diameter of the check valve plate 30 so as provide the check valve assembly 28 with a generally T-shaped configuration in longitudinal cross section. An axial bore 34 is formed in the cylindrical integral body 32, and it extends inwardly through the check valve plate 30 into the body 32. Mounted in the axial bore 34 is a cylindrical sintered bronze filter 36, which is staked in place in the outer end of the axial bore 34 by a conventional staking tool with a pointed end. The staking tool displaces the metal on the outer side of the round plate 30, in spaced apart positions around the axial bore 34, to form staking dimples 38 where the metal is pressed into a frictional holding engagement with the sintered bronze filter 36. The numeral 40 designates the metal of the dimples in the round plate 30 that is pressed against the cylindrical sintered bronze filter 36 to hold the filter 36 in place. An axial orifice 42 is formed through the closed inner end of the cylindrical check valve body portion 32.

As best seen in FIGS. 4 and 5, a combination piston and piston rod member, generally indicated by the numeral 44, is slidably mounted in the piston chamber or outer bore 18 through the open end 16 of the outer bore 18. The combination piston and piston rod member 44 is provided on the outer end thereof with a mounting or clevis hole 46. An axial bore 48 is formed in the combination piston and piston rod member 44, and it extends longitudinally inward, from the inner end 50 of the combination piston and piston rod member 44, and terminates at an inner end wall indicated by the numeral 52. As shown in FIG. 5, an elongated compression coil spring 54 is mounted in the bore 48 in the combination piston and piston rod member 44, and it has one end seated against the inner end wall 52 in the bore 48 and the other end seated against the rear face 57 of the check valve plate 30. The spring 54 holds the check valve plate 30 against the shoulder 22. The combination piston and piston rod member 44 is provided with a peripheral groove 56, formed around the inner end thereof, in which is operatively mounted an O-ring seal 58 for sliding and sealing engagement with the surface of the piston chamber or outer bore 18.

FIGS. 1 and 2 illustrate one application for use of the shock absorber 10 of the present invention. The numeral 74 indicates a copy machine in fragment. Mounted on the copy machine 74, on the upper side thereof is a bracket, generally indicated by the numeral 76, which has a horizontal leg 78 and a vertical leg 80.

The bracket 76 would be placed at one side of the copy machine for controlling and decelerating the final movement of a conventional lid 88 over the copy machine 74. The lid 88 is operatively mounted on the upper end of a pivotal lever 84 which is pivotally mounted on the bracket vertical leg 80 by means of a suitable pivot pin 86. The shock absorber combination piston and piston rod member 44 is pivotally attached to the mounting bracket vertical leg 80 by means of a suitable pivot pin 82 which is mounted through the mounting hole 46 in the combination piston and piston rod member 44. The shock absorber body 12 is pivotally attached to the upper end of the lever 84 by means of a suitable pivot pin 90 which is mounted through the elongated slot 14 in the shock absorber body 12 and affixed to the lever 84 by any suitable means. The pivot pin 90 has its inner end affixed to the lever 84 by any suitable means.

In use, the numeral 88b shows the copy machine lid swung manually, counterclockwise to an open position with the pivot pin 90 seated against the outer end of the slot 14 in the shock absorber body 12, and the shock absorber body 12 moved upwardly axially while the combination piston and piston rod member 44 pivots but does not move axially. When it is desired to close the lid 88 it can be manually moved clockwise to the position indicated by the numeral 88c, without any resistance from the shock absorber 10, since the pivot pin 90 moves freely downward through the length of the slot 14 to a point where it seats on the inner end of the slot 14. The lid 88 is then moved by gravity beyond the point 88c, and the shock absorber body 12 moves downwardly over the combination piston and piston rod member 44, to the final solid line position, shown in FIG. 2, where the lid 88 would be in a closed position. When it is desired to move the lid 88 again to the open position 88b, the lid 88 is grasped by a user of the copy machine and manually swung upward to the position 88b. To close the lid 88 it is then manually grasped and moved to position 88c after which the weight of the lid moves the lid 88 downward by gravity to the position in FIG. 2 marked by the numeral 88. Accordingly, it will be seen that the shock absorber 10 performs its shock absorbing function between the lid positions 88c and 88 during a lid closing operation.

The internal functioning of the shock absorber 10 can be seen from the aforedescribed structure shown in FIGS. 4 and 5. In assembling the shock absorber 10, the closed cell sponge accumulator means 26 is mounted in the inner bore or accumulator chamber 20 from the open end 16 of the outer bore 18. The check valve assembly 28 is then positioned in the outer bore or piston chamber 18 against the seat or shoulder positioin, and conventional shock absorber oil is vertical position, and conventional shock absorber oil is then poured into the outer bore or piston chamber 18. The combination piston and piston rod member 44, with the spring 54 carried inside thereof, is slidably mounted through the outer end 16, of the outer bore or piston chamber 18, into the shock absorber body 12. The next step in the use of the shock absorber 10 would be to mount it in an operable position relative to a swingable member to be controlled, such as the aforedescribed copy machine lid 88. The combination piston and piston rod 44 would be held in the shock absorber body 12 by means of the pivot pins 82 and 90, shown in FIG. 2. When the lid 88 is moved from the position 88c to the solid line position 88 shown in FIG. 2, the shock absorber body 12 moves from an extended position shown in FIGS. 4 and 5 downwardly to the solid line position shown in FIG. 2. During the downward movement of the shock absorber body 12 over the combination piston and piston rod member 44, the oil in the outer bore 18 is forced through the metering orifice 42 and through the sintered bronze filter 36 and into the accumulator chamber 20. The oil forced into the accumulator chamber 20 compresses the accumulator closed cell sponge 26. When the lid 88 is moved to the open position 88b shown in FIG. 2, the shock absorber body 12 is pulled upwardly, whereby a vacuum is created by the relative movement between the shock absorber body 12 and the piston and piston rod member 44 so as to move the shock absorber body 12 to the position shown in FIG. 5, and move the check valve plate 30 off the shoulder or seat 22 and allow the oil under pressure in the accumulator chamber 20 to flow back into the outer bore 18 to put the shock absorber 10 in a position for another shock absorbing action.

The size of the metering orifice 42 determines the force or load absorbed by the reluctance of the oil to flow through the metering orifice 42. This principle is well known and understood in the shock absorber art. The sintered bronze filter 36 is used to prevent the oil entering into the accumulator chamber 20, at high pressure, from eroding or boring a hole through the closed cell sponge accumulator means 26.

Figure 6:
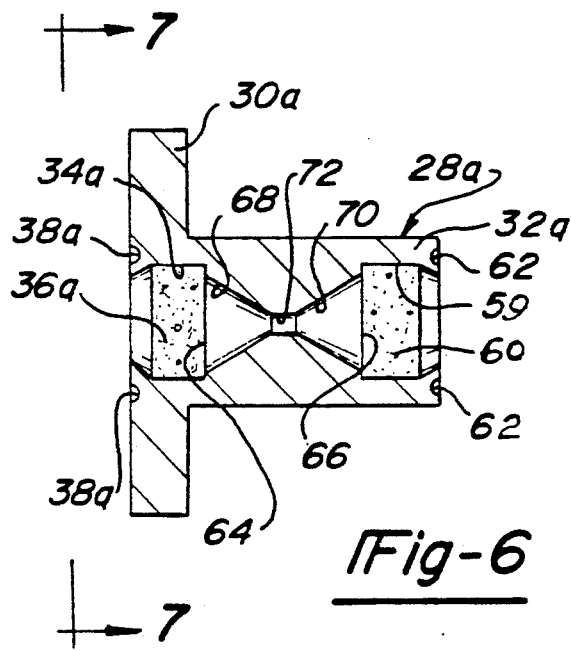
FIG. 6 is an enlarged elevation section view of a second embodiment of a check valve assembly that may be employed in the fluid shock absorber shown in FIGS. 1-5.
Figure 7:
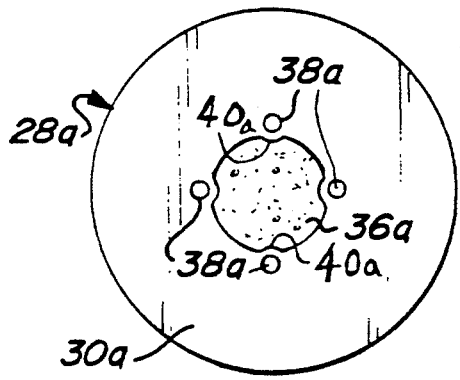
FIG. 7 is a left side elevation view of the check valve assembly illustrated in FIG. 6, taken along the line 7—7 thereof, and looking in the direction of the arrows.

FIGS. 6 and 7 illustrate a second embodiment of a check valve assembly which may be employed in the shock absorber of the present invention. The parts of the check valve assembly embodiment 28a shown in FIGS. 6 and 7, which are the same as the parts of the first check valve assembly embodiment 28, have been marked with the same reference numerals followed by the small letter "a".

In the check valve assembly 28a shown in FIGS. 6 and 7, the bore 34a in the body 32a is shortened and communicates at its inner end with the larger end of a cone shaped passage 68, that has its smaller end communicating with a longitudinally disposed cylindrical metering orifice 72. The other end of the metering orifice 72 communicates with a cone shaped passage 70 which is identical to the cone shaped passage 68, but disposed in a reverse position. The larger outer end 66 of the cone shaped passage 70 communicates with a bore 59 in which is seated a sintered bronze filter 60. The bore 59 is aligned with the bore 34a and is of the same diameter. The sintered bronze filter 60 is of the same size as the sintered bronze filter 36a. The sintered bronze filter 60 is held in position in the same manner as the sintered bronze filter 36a, by means of staking the metal on the outer end of the body 28a against the filter 60 which forms staking dimples 62 around the outer end of the bore 59.

In use, when the check valve assembly 28a is employed in the shock absorber 10 of the invention, the oil is forced during a shock absorbing operation from the outer bore 18 through the sintered bronze filter 60 and thence through the cone shaped passage 70, the metering orifice 72, the cone shaped passage 68, the sintered bronze filter 36a, and into the accumulator chamber 20. When the shock absorber body 12 is moved in a reverse position to the position shown in FIG. 5, the check valve plate 30a lifts off of the shoulder or seat 22, against the pressure of the spring 54, to permit the oil to be sucked by vacuum back around the plate 30a into the outer bore 18. It will be seen that the cone shaped passages 68 and 70 are positioned relative to each other so that their smaller ends communicate with the opposite ends of the metering orifice 72.

Figure 8:
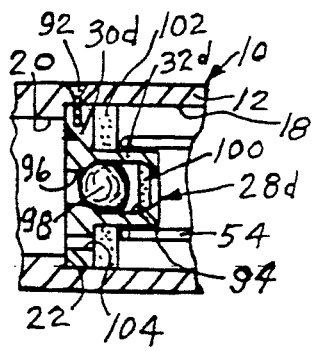
FIG. 8 is a fragmentary, elevation section view of a fluid shock absorber provided with a third embodiment of a check valve assembly which may be employed in a fluid shock absorber made in accordance with the invention.

FIG. 8 illustrates a third embodiment of a check valve assembly 28d which may be employed in the shock absorber of the invention. The parts of the check valve assembly 28d which are the same as the parts in the check valve assembly 28 shown in FIGS. 4 and 5 have been marked with the same reference numerals followed by the small letter "d".

In the check valve embodiment 28d the plate 30d is held in place on the seat or shoulder 22 by means of a suitable machine screw 92 that is mounted through an opening in the wall of the body 12 and thence into threaded engagement with the plate 30d to hold the plate 30d against the seat or shoulder 22. The check valve body 32d has formed there-through a bore 94 which communicates at its one end with a return passage 96 that is formed through the plate 30d, and which communicates with the outer bore or accumulator chamber 20. Operatively mounted for movement in the bore 94 is a suitable ball check valve 98 which is moved to a seat over the return passage 96 during a shock absorbing action. A sintered bronze filter 100 is mounted in the bore 94 and is held in place in the front end thereof by staking the metal at the front end of the bore 94 to hold the filter 100 in place, in the same manner as the filter 36 is held in place in the first embodiment of FIG. 5. A metering orifice 104 is formed through the circular plate 30d. A ring shaped sintered bronze filter 102 is mounted around the check valve body 32d and is suitably fixed to the plate 30d.

In use, when the shock absorber body 12 is moved over the combination piston and piston rod member 44 the oil in the inner bore 18 is forced against the ball check valve 98 to hold it on its seat over the return passage 96. The oil under pressure in the outer bore or piston chamber 18 is forced through the metering orifice 104 into the accumulator chamber 20. When the combination piston and piston rod member 44 is withdrawn to a position as shown in FIG. 5 the oil is drawn by vacuum from the accumulator chamber 20 through the return passage 96, since the suction on the oil created by the withdrawing combination piston and piston rod member 44 will move the ball check valve 98 off of the seat on the return passage 96 to allow the oil to return to the piston chamber 18.

Figure 9:
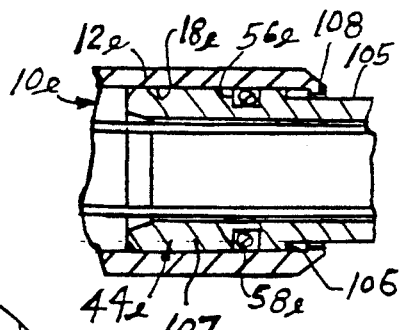
FIG. 9 is a fragmentary, elevation section view of a modified piston rod end of a fluid shock absorber made in accordance with the invention.

FIG. 9 is another embodiment showing a modification of the shock absorber body 12e and the combination piston and piston rod member 44e. The parts of the embodiment illustrated in FIG. 9 which are same as the structure in the first embodiment of FIGS. 1 through 5 have been marked by the same reference numerals followed by the small letter "e".

In the embodiment of FIG. 9 the combination piston and piston rod member 44e is provided with a reduced diameter outer end portion 105 so as to provide a shoulder 106 between the reduced diameter portion 105 and the inner end portion 107 which has a diameter of a larger size to provide a sliding engagement in the piston outer bore 18e. The outer end of the shock absorber body member 12e is rolled radially inward to form an inward directed annular flange 108 which has a sliding engagement with the surface of the reduced diameter portion 105 of the combination piston and piston rod member 44e. The rolled over end flange 108 is adapted to engage the shoulder 106 and limit the outward movement of the combination piston and piston rod member 44e from the shock absorber body member 12e.

It will be understood, that although the shock absorber 10 is illustrated as having the impact force received by a movable tubular body member 12, the shock absorber 10 could be employed to have an impact force received by the movable piston and piston rod member 44 while the tubular body member is in a fixed position. It will also be understood that some oil will be drawn back into the piston chamber 18 when the combination piston and piston rod member 44 is moved outwardly of the shock absorber body member 12.

What is claimed is:

1. A shock absorber (10) comprising:
   (a) an elongated tubular body member (12) having a stepped bore which extends inwardly from one open end (16) thereof, and which includes an outer bore portion (18) and an inner bore portion (20) having a diameter smaller than the outer bore portion (18) so as to form an annular seat (22) at a point where the outer (18) and inner (20) bores portions meet;
   (b) said inner bore portion (20) having a closed outer end (24) and functioning as an accumulator chamber (20), and having mounted therein an accumulator means (26);
   (c) a check valve assembly (28, 28a, 28d) mounted in said outer bore portion (18) and being seated on said annular seat (22);
   (d) said outer bore portion (18) comprises a piston chamber having slidably mounted therein, through the open end (16) thereof, a combination piston and piston rod member (44);
   (e) a spring means (54) operatively mounted in the piston chamber (18) for biasing the combination piston and piston rod member (44) to an initial shock absorbing position in the tubular body (12) and returning the combination piston and piston rod member (44) to said initial shock absorbing position after a shock absorbing operation; and,
   (f) said piston chamber (18) having mounted therein a supply of shock absorber oil, whereby when at least one of the shock absorber members (12, 44) is moved longitudinally relative to the other under an impact force, so as to move the combination piston and piston rod member (44) inwardly in the piston chamber (18), oil in the piston chamber (18) is forced through the check valve assembly (28, 28a, 28d) and into the accumulator chamber (20), and when the impact force is removed, the combination piston and piston rod member (44) is moved outwardly in the piston chamber (18) and oil is withdrawn by vacuum from the accumulator chamber (20) and passes around a part (30, 30a, 98) of the check valve assembly (28, 28a, 28d) and returns into the piston chamber (18).

2. A shock absorber (10) as defined in claim 1, wherein:
   (a) one (44) of said shock absorber members has means (46) for attaching the same to a fixed object; and,
   (b) the other (12) one of said shock absorber members has means (13, 14) for attaching the same to a movable object for receiving an impact force, and which means (14) permits a predetermined amount of movement of the movable object before it exerts an impact force on said other one (12) of said shock absorber members.

3. A shock absorber (10) as defined in claim 1, wherein:
   (a) said check valve assembly (28, 28a, 28d) has a metering orifice (42, 72, 104) through which the shock absorber oil is passed from the piston chamber (18) to the accumulator chamber (20) when an impact force is receive by one of said shock absorber members (12, 44).

4. A shock absorber (10) as defined in claim 3, wherein:
   (a) the metering orifice (42, 72, 104) is provided with at least one filter (36, 36a, 60, 102).

5. A shock absorber (10) as defined in claim 3, wherein:
   (a) the check valve assembly (28, 28a) is biased into a seating engagement on said annular seat (22) by said spring means (54) and is movable off of the annular seat (22) against the bias of the spring means (54) when the combination piston and piston rod member (44) is moved outwardly in the piston chamber (18) to create a vacuum in the piston chamber (18) to cause oil to flow from the accumulator chamber (20) and around the check valve assembly (28, 28a) into the piston chamber (18).

6. A shock absorber (10) as defined in claim 5, wherein:
   (a) the check valve assembly (28) includes,
       (1) a circular plate (30) that is biased into a seating engagement on said annular seat (22) by said spring means (54);
       (2) an integral, longitudinal body (32) is formed on said circular plate (30) and it has an end extended into said piston chamber (18); and,
       (3) said metering orifice (42) is formed in said integral, longitudinal body (32) on the circular plate (30) and communicates on one end thereof with the piston chamber (18) and on the other end thereof with a bore (34), in said integral, longitudinal body (32), that extends through said plate (30) and communicates with the accumulator chamber (20).

7. A shock absorber (10) as defined in claim 6, wherein:
   (a) a filter (36) is seated in the bore (34) in said integral, longitudinal body (32).

8. A shock absorber (10) as defined in claim 5, wherein:
   (a) the check valve assembly (28a) includes,
       (1) a circular plate (30a) that is biased into a seating engagement on said annular seat (22) by said spring means (54);
       (2) an integral, longitudinal body (32a) is formed on said circular plate (30a) and it has an end extended into said piston chamber (18);
       (3) said metering orifice (72) is formed centrally in said integral, longitudinal body (32a), on the circular plate (30), and communicates on one end thereof with the piston chamber (18) through an outwardly diverging passage (70) and a circular bore (59) in said integral, longitudinal body (32a), and communicates on the other end thereof with the accumulator chamber (20) through an outwardly diverging passage (68) and a circular bore (34a) in said integral, longitudinal body (32a).

9. A shock absorber (10) as defined in claim 8, wherein:

(a) a filter (36a, 60) is seated in each of said circular bores (34a, 59) in said integral, longitudinal body (32a).

10. A shock absorber (10) as defined in claim 3, wherein:
 (a) the check valve assembly (28d) includes,
  (1) a circular plate (30d) fixedly seated on said annular seat (22) in said elongated tubular body member (12);
  (2) said metering orifice (104) is formed through said circular plate (30d);
  (3) an integral, longitudinal body (32d) is formed on said circular plate (30d) and it has an end extended into said piston chamber (18);
  (4) said integral, longitudinal body (32d) has a bore (94) therethrough which communicates at one end, with the piston chamber (18) and at the other end with a bore (96) that extends through the circular plate (30d) and communicates with the accumulator chamber (20); and,
  (5) a ball check valve (98) movably mounted in said bore (94) in said integral, longitudinal body (32d) which checks the flow of oil through the bore (96) in the circular plate (30d) during a shock absorbing action by the shock absorber (10), and which allows oil to flow back to the piston chamber (18) when the combination piston and piston rod member (44) returns to its initial position.

11. A shock absorber (10) as defined in claim 10, wherein:
 (a) a filter (102) is seated over the piston chamber end of said metering orifice (104).

12. A shock absorber (10) as defined in claim 3, wherein:
 (a) said elongated tubular shock absorber body (12e) is provided with means (108) to engage a portion (106) on the combination piston and piston rod member (44e) for limiting the movement of the combination piston and piston rod member (44e) outwardly of said elongated tubular shock absorber body (12e).

* * * * *

UNITED STATES PATENT AND TRADEMARK OFFICE
CERTIFICATE OF CORRECTION

PATENT NO. : 5,217,212
DATED : June 8, 1993
INVENTOR(S) : William J. Chorkry, Sr., et al It is certified that error appears in the above-indentified patent and that said Letters Patent is hereby corrected as shown below:

Column 4, line 53, after "shoulder" delete "positioin", and, insert --22. The Shock absorber body 12 would be held in a--.

Column 4, line 54, delete "and conventional shock absorber oil is".

Signed and Sealed this

Third Day of May, 1994

Attest:

BRUCE LEHMAN

Attesting Officer

Commissioner of Patents and Trademarks